Patented Oct. 22, 1940

2,218,645

UNITED STATES PATENT OFFICE 2,218,645

POLYVINYL HALIDE COMPOSITION

Archie B. Japs, Cuyahoga Falls, Ohio, assignor to The B. F. Goodrich Company, New York, N. Y., a corporation of New York No Drawing. Application April 15, 1938,
Serial No. 202,273

4 Claims. (Cl. 260—88)

This invention relates to polyvinyl halides, and has as its principal object to provide stable polyvinyl halide compositions.

Polyvinyl halides have found many useful applications because of their extraordinary resistance to oxidation, organic solvents, acids, alkalies, and other deteriorating influences. Compositions containing polyvinyl halides, however, have frequently tended to discolor during the heat treatment required for molding them, or after exposure to natural or artificial light for periods of time, which darkening was apparently caused by some fundamental change in the composition. Solutions of polyvinyl halides have also had a tendency to gel irreversibly in the presence of metals or metallic halides. Such solutions were particularly susceptible to gelling in the presence of iron, as little as .003% often causing the reaction, particularly when the solution was heated.

By the method of this invention, compositions are produced which have greatly increased resistance to heat and light, and which remain unchanged in solution for considerable periods of time, even in the presence of metals. These beneficial results are obtained by incorporating in the polyvinyl halide a member of the class consisting of the alkali metal and lead salts of the oxyacids of boron and phosphorus. Any type of polyvinyl halide such as alpha, beta, delta, and gamma polyvinyl chloride, polyvinyl bromide, or even polyvinyl halide compositions formed by the conjoint polymerization of a vinyl halide such as vinyl chloride and a vinyl ester of an aliphatic acid such as vinyl acetate may be stabilized with the materials of this invention. Since the plasticized gamma polyvinyl chlorides described in U. S. Patent No. 1,929,453 issued to Waldo L. Semon show the greatest commercial promise, the invention will be described in detail with reference to these materials, though it is to be understood that the invention is equally applicable to other polyvinyl halides as set forth above.

The stabilizer may contain as the metallic radical lead or any alkali metal such as sodium, potassium, or lithium, the lead, sodium and potassium compounds being in general preferable. Any oxyacids of boron and phosphorus may be used. Thus, suitable lead stabilizers include lead orthophosphate, lead metaphosphate, lead pyrophosphate, lead phosphite, and lead metaborate. The sodium salts of oxy-acids of boron include sodium metaborate, sodium perborate, and ordinary borax (sodium tetraborate). Of the three alkali metal orthophosphates, the tribasic phosphates are most effective stabilizers, though the dibasic and monobasic orthophosphates and other phosphates may be used.

The addition of the stabilizer may be performed at any time during the polymerization of the vinyl chloride or the plasticization thereof, though it is preferably added before the composition is heat-molded. A small proportion, from 1 to 10% for instance, of one of the stabilizers, preferably in finely-divided form, may be incorporated in a composition comprising gamma polyvinyl chloride 57 parts and tricresyl phosphate 43 parts on a heated mill. Thus when 2 parts of trisodium phosphate or lead borate are incorporated in the above compositions and they are heated in a mold for 20 min. at 297° F. light-colored compositions having excellent resistance to discoloration by heat or light are produced.

In another embodiment, a plasticized gamma polyvinyl chloride composition is dissolved at an elevated temperature in a suitable solvent such as mesityl oxide or chlortoluene, and a finely divided stabilizer, borax for instance, may be stirred into the solution. This hot solution will keep for weeks without gelling, even in the presence of small amounts of metal. In thin solutions, part of the stabilizer may eventually collect on the bottom, particularly if it was not finely ground. In all cases, however, it has been found that sufficient stabilizer remains either suspended or dissolved in the solution to stabilize it efficiently. The films formed by dipping articles in this solution and driving off the solvent are found to be more resistant to discoloration by heat and light than unstabilized compositions.

The compositions of this invention may contain, besides the stabilizer, carbon black, zinc oxide, barytes, clay, wood flour and other pigments and fillers commonly used in the rubber and plastics industries. The polyvinyl halides may also contain appreciable amounts of other polymers such as polyvinyl organic esters either conjointly polymerized therewith or incorporated therein after polymerization.

While I have herein described specific embodiments of my invention, it is not limited solely thereto, for it will be obvious to those skilled in the art that many modifications including substituting equivalent materials and varying the proportions of materials used are within the spirit and scope of the invention as defined in the appended claims.

I claim:

1. The method of stabilizing plasticized gamma polyvinyl chloride which comprises incorporating therein an alkali metal phosphate.

2. The method of stabilizing plasticized gamma polyvinyl chloride which comprises incorporating therein trisodium orthophosphate.

3. Plasticized gamma polyvinyl chloride containing an alkali metal phosphate.

4. Plasticized gamma polyvinyl chloride containing trisodium orthophosphate.

ARCHIE B. JAPS.